Patented Mar. 8, 1938

UNITED STATES PATENT OFFICE 2,110,539

WATERPROOFED FABRIC AND COATING MIXTURE THEREFOR

Albert J. Weiss, Mineola, N. Y., assignor to Vulcan Proofing Company, New York, N. Y., a corporation of New York No Drawing. Application November 7, 1935, Serial No. 48,719

3 Claims. (Cl. 134—17)

My invention relates to a new and improved waterproofed fabric and a coating mixture therefor.

One of the objects of my invention is to provide a coating mixture which can be spread upon any suitable woven or felted fabric, said coating being tough, flexible, waterproof, and weather-resistant.

Another object of my invention is to provide a coating material which can be embossed and which will have the slippery and dry feel which is characteristic of pyroxylin coating materials or finished leather.

Another object of my invention is to provide a coating material which may be made in any desired color, and whose lustre can be varied within very broad limits.

Another object of my invention is to provide a coating material or mixture which shall have the above mentioned characteristics, and which will consist mainly of rubber.

Other objects of my invention will be set forth in the following description, it being understood that the above statement of the objects of my invention is intended to generally explain the same without limiting it in any manner.

While rubber coating materials have heretofore been proposed for making waterproof fabrics which can be used as leather substitutes, there have been several objections to the use of rubber coating materials, so that pyroxylin coating materials have come into very large use. The rubber coating materials had a tacky feel and they could not be effectively embossed or decorated.

While I do not wish to be limited to the ingredients or proportions specified herein, an illustrative example of the coating is as follows, the proportions being by weight:—

| | Parts |
|---|---|
| Rubber | 100 |
| Shellac | 100 |
| Chlorinated rubber | 50 to 100 |
| Carbon black | 5 |
| Magnesium carbonate | 4 |
| Butyl phthalyl butyl glycollate | 12 to 25 |

The coating mixture or composition above specified is made as follows:—

The shellac, the carbon black and the magnesium carbonate are intermixed with the rubber in a mill in the conventional manner, so as to produce a thorough mixture. This batch is then treated with a suitable solvent, such as benzol, or solvent naphtha, so that the batch is made thick and viscous, like a rubber cement. This viscous solution may be designated as "Solution A".

In this solution the rubber is either dissolved or dispersed and while I prefer to have "Solution A" in thick and viscous form, it may be made as thin as desired, by using sufficient solvent.

I then dissolve the chlorinated rubber and the butyl phthalyl butyl glycollate in any suitable common solvent such as benzol or solvent naphtha, thus making "Solution B".

The two solutions are then thoroughly intermixed.

These operations can be performed at an ordinary room temperature of about 70° F.

Instead of using carbon black, I can use any other suitable pigment and I can use any suitable mixtures of pigments. For example, I can use a suitable white pigment, or a mixture of a white pigment and any colored pigment. The pigments which are used for coloring rubber are well known and I can use any suitable pigment or pigments of this type.

The butyl phthalyl butyl glycollate serves to plasticize the mixture.

The lustre of the coating composition is controlled by the precentage of chlorinated rubber and of the butyl phthalyl butyl glycollate. Increasing the proportion of either the chlorinated rubber or of the butyl phthalyl butyl glycollate increases the lustre of the coating composition. Increasing the proportion of chlorinated rubber also tends to increase the toughness of the coating composition and to reduce its flexibility.

The completed coating mixture can be used for saturating any suitable fabric as well as for coating a fabric. I do not wish to be limited to coating any particular type of fabric, and I may coat materials other than fabrics. Said composition can be applied by means of numerous devices, such as squeeze rolls, by means of a scrape knife, or by means of a spreader knife.

A particular advantage of the improved coating mixture over the coating mixtures which have previously been known is that I can apply the improved coating mixture as a finishing coat, over a conventional rubber coating which has been spread upon a fabric or the like.

The improved coating mixture adheres in a very satisfactory manner to vulcanized rubber or to unvulcanized rubber.

In order to apply the improved coating mixture I prefer to apply the same in the form of a plurality of light or thin coats, while permitting the solvent to evaporate before applying each successive coating.

The thickness of each said coating may be 0.0005 inch and the total thickness of the coating may be 0.001 to 0.004 inch.

After the coating has been completed, it may be embossed by any well known method, before the final finishing operation. However, if it is desired to produce very sharp embossing, with the use of a hot embossing plate or the use of a hot embossing roll, it may be desirable to give the coating its finishing treatment, before embossing by means of heat and pressure.

The final finishing operations comprise the successive treatment of the surface of the coating with sulphur chloride, bromine, and finally with ammonia, in the order above mentioned, said three materials being separately and successively applied in said order.

I prefer to apply the sulphur chloride by means of a doctor roll, using a solution of about three ounces of sulphur chloride per gallon of solvent. I prefer to use a solvent which consists of equal proportions by weight of benzol and of carbon tetrachloride.

This treatment with sulphur chloride brings out the lustre and it hardens the surface.

The bromine is then applied by means of a doctor roll, using a solution which contains about one pound of bromine per one hundred pounds of carbon tetrachloride.

The treatment with the bromine serves to harden the surface additionally. I then bring the suface of the coating in contact with concentrated gaseous ammonia in order to neutralize acidity.

If cabon black is used as the pigment, the coating material does not require heat vulcanization. However, I can add to the formula above mentioned, suitable vulcanizing ingredients such as sulphur, and I can also add zinc oxide, accelerators, etc., and I can vulcanize the coating material under heat in the usual manner, at temperatures from 220° F.–320° F.

I can use pressure as well as heat, if desired, for vulcanizing said coating material. If I utilize heat vulcanization, I can omit the sulphur chloride surface treatment, although I can use this sulphur chloride surface treatment, even if heat vulcanization is utilized.

A fabric which has been coated with the improved material, can be used for making luggage, belts, handbags, harness, book bindings, upholstery and the like.

Instead of using the specific materials above mentioned, I can use various substitutes. For example the natural rubber can be replaced by synthetic rubber-like materials, such as those which are commercially known as "Duprene", "Thiokol" and "Glyptal".

The "Duprene" refers to chloro 2-butadiene 1,3 polymer, and some of the methods of manufacturing this product are set forth in "Journal of American Chemical Society" Vol. 53, No. 11, p. 4203, published in Nov. 1931; also in U. S. Patents Nos. 1,950,431; 1,950,432; 1,950,434; 1,950,435; 1,950,436; 1,967,860; 1,967,861, among others.

The "Thiokol" represents certain products which result from interacting polysulfides and additive halogen olefins, as, for example, by reacting sodium polysulphide with dichlor ethylene.

The "Glyptal" refers to a series of synthetic resins produced by the action of organic acids on glycerol.

Instead of using chlorinated rubber, I can use rubber which has been polymerized with the use of halogenated acids of tin, or I can use rubber which has been polymerized with sulphuric acid or its derivatives, such as sulphonic acid or acids. Likewise the shellac can be replaced by the chlorinated rubber or by an equivalent rubber-reaction material.

Reaction products obtained with rubber and halogenated acids of tin are described in U. S. Patent No. 1,797,188 issued to Bruson in 1931.

Reaction products with rubber and sulphuric acid and sulphuric acid derivatives are described in Inc. Eng. Chem. (1927) Vol. 19, pp. 1325 and 1328; and in Rubber Chem. Tech. (1928) Vol. 1, p. 1.

The function of shellac or equivalent material is to give the coating material the desired dry and non-tacky feel. Instead of using shellac, I can use other resinous material such as soluble synthetic resins of the phenol-formaldehyde or phenol-aldehyde type, copal, gum dammar, and other soluble natural and synthetic resins.

Instead of using the plasticizer which has been specifically mentioned, I can use methyl phthalyl ethyl glycollate, tung oil or linseed oil. If I use either tung oil or linseed oil, the same may be boiled while maintaining them in the liquid state.

I can use also soy-bean oil, and non-drying oils, such as raw castor oil, palm oil, etc.

I can also use fatty acid esters, such as butyl stearate, amyl stearate, phthalic acid esters, phosphoric acid esters, citric acid esters. I can also use chlorinated aromatic compounds, phthalic acid esters as exemplified by dibutyl phthalate, phosphoric acid esters as exemplified by tri-cresyl phosphate, citric acid esters such as triethyl citrate. As examples of chlorinated aromatic compounds, I refer to chlorinated diphenyl of varying degrees of chlorination I can also use sulphurized terpenes, such as sulpho-terpoil.

By using suitable proportions of the ingredients, I can produce a coated material which has the lustre and feel of the waterproof material which is made with the use of a pyroxylin composition.

The function of the magnesium carbonate is to neutralize any acidity in the chlorinated rubber or other rubber derivative. It may be replaced by magnesium oxide or calcium carbonate.

Whenever I refer to any specific material, either in the description or in the claims, it is to be understood that I include equivalent materials, and that every material which is mentioned specifically is to be considered as representing a class of which the specific material is an example.

While I have selected certain preferred ingredients, in order to give a typical formula, said formula may be varied by adding an additional ingredient or ingredients.

The rubber and shellac (if this is used) and the chlorinated rubber (or its equivalent) may be considered as forming the base of the composition.

I claim:

1. A coating composition comprising substantially 100 parts of rubber, 100 parts of shellac, 50 to 100 parts of chlorinated rubber, a pigment, 4 parts of magnesium carbonate, and from 12 to 25 parts of butyl phthalyl butyl glycollate.

2. A coating composition comprising rubber and shellac and chlorinated rubber and a plasticizer, there being a sufficient proportion of shellac and chlorinated rubber in the composition to give said composition a dry and non-tacky feel.

3. A coating composition comprising rubber, shellac in substantially the same proportion as the rubber, and chlorinated rubber, the proportion of the chlorinated rubber being from 50% to 100% of the proportion of the rubber.

ALBERT J. WEISS.